Nov. 14, 1933.    G. L. NEELY    1,934,734
LUBRICATOR FOR VALVES AND THE UPPER WALLS OF CYLINDERS
Filed June 2, 1930    4 Sheets-Sheet 1

Inventor
George Leonard Neely
By Lyon & Lyon
Attorneys

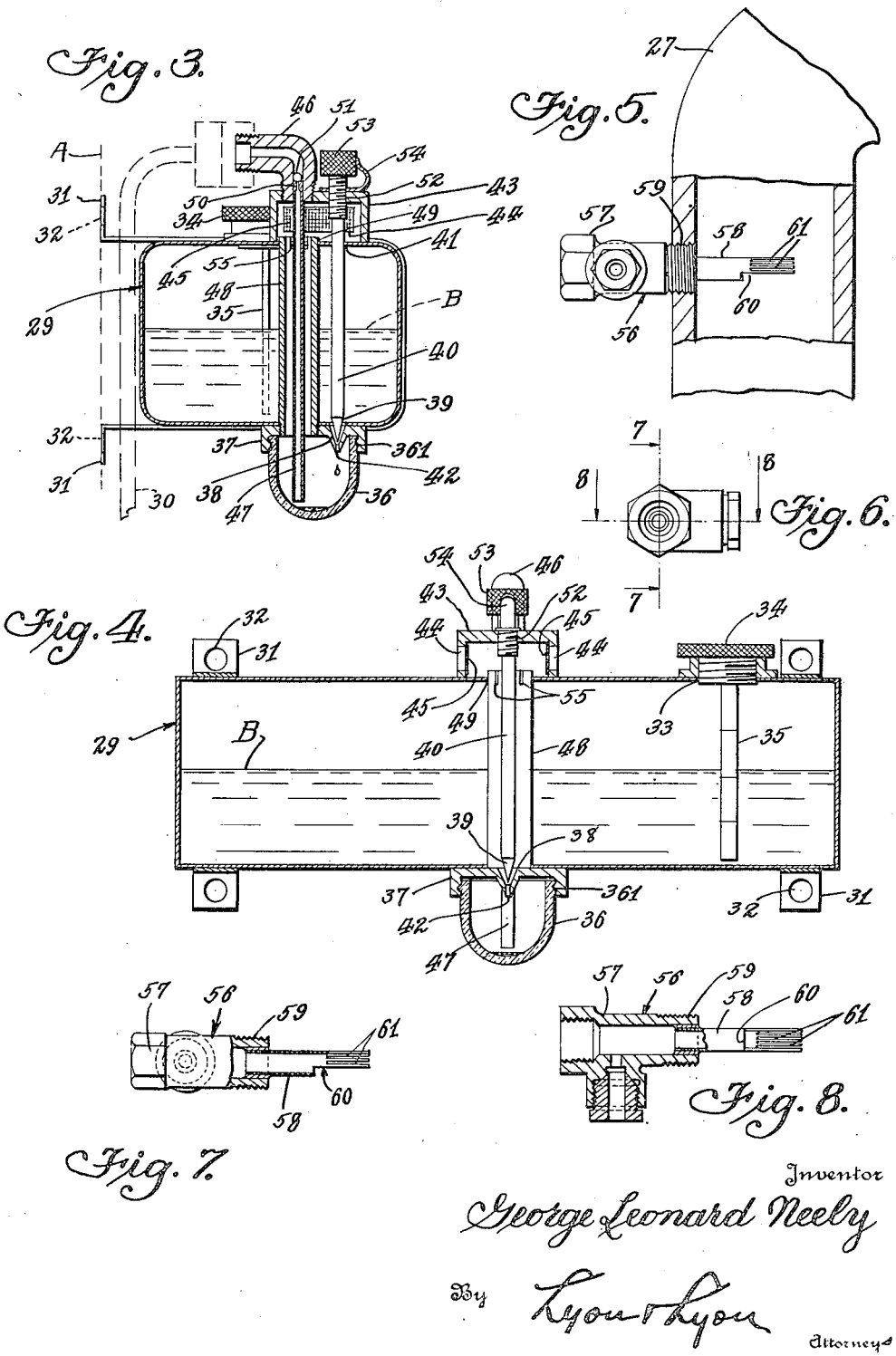

Nov. 14, 1933.    G. L. NEELY    1,934,734
LUBRICATOR FOR VALVES AND THE UPPER WALLS OF CYLINDERS
Filed June 2, 1930    4 Sheets-Sheet 3
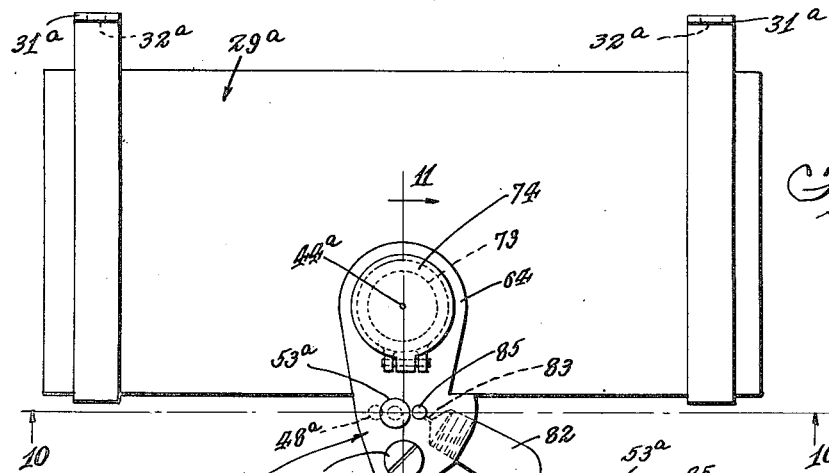
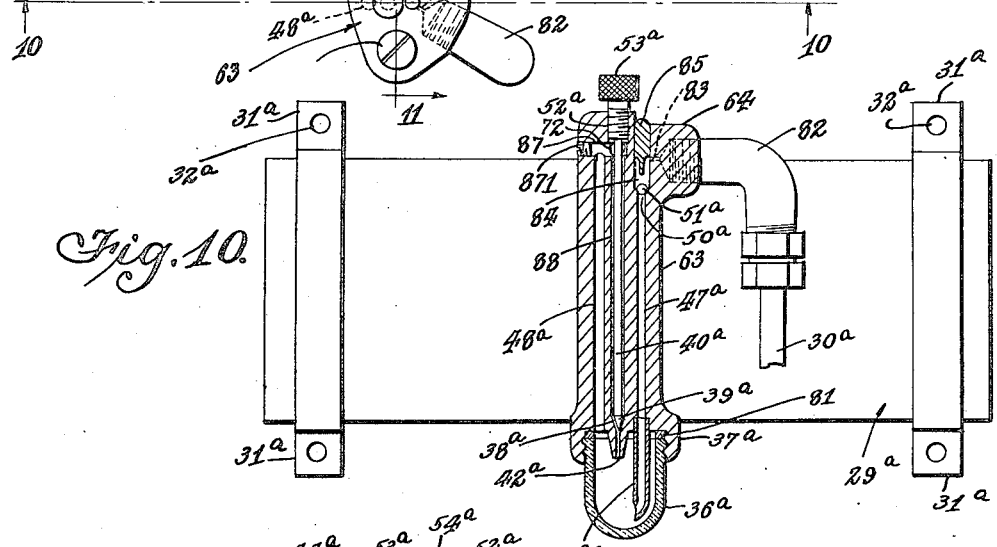
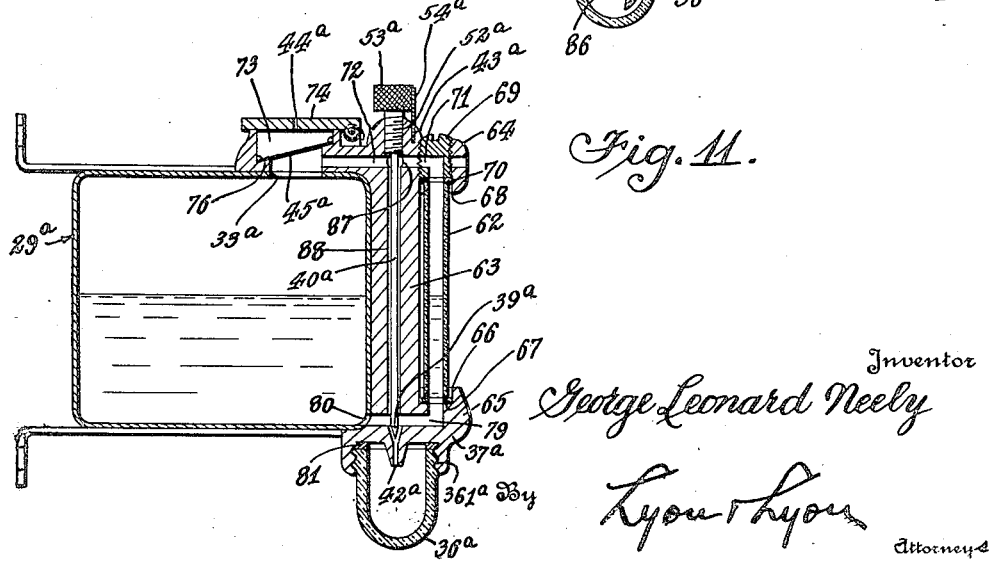
Inventor
George Leonard Neely
By Lyon & Lyon
Attorneys Nov. 14, 1933.    G. L. NEELY    1,934,734
LUBRICATOR FOR VALVES AND THE UPPER WALLS OF CYLINDERS
Filed June 2, 1930    4 Sheets-Sheet 4
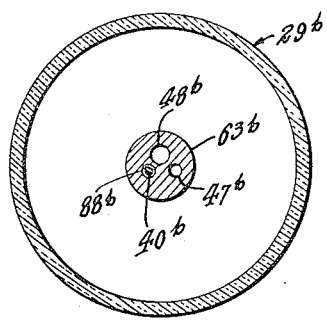
Fig. 12.
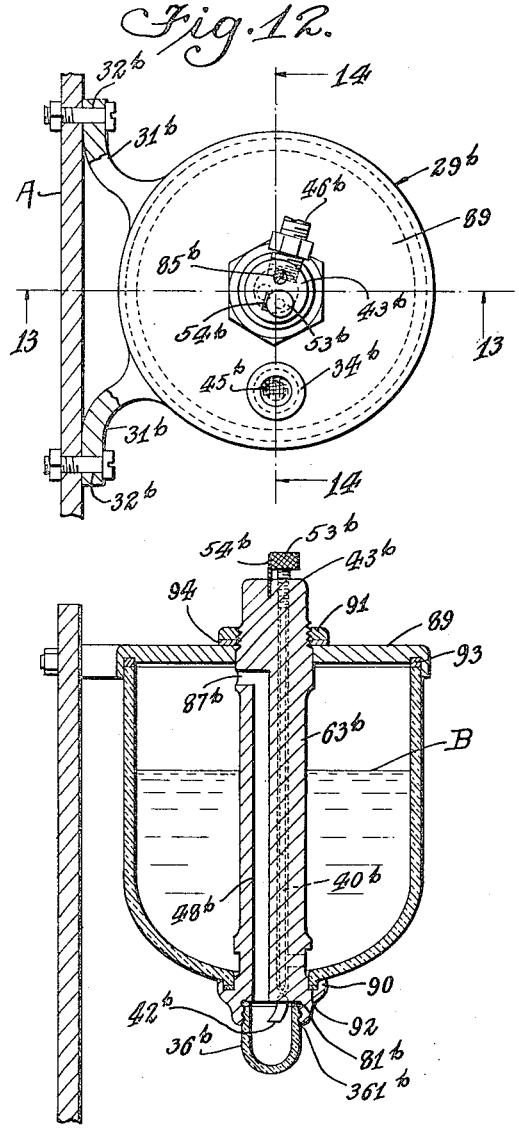
Fig. 13.
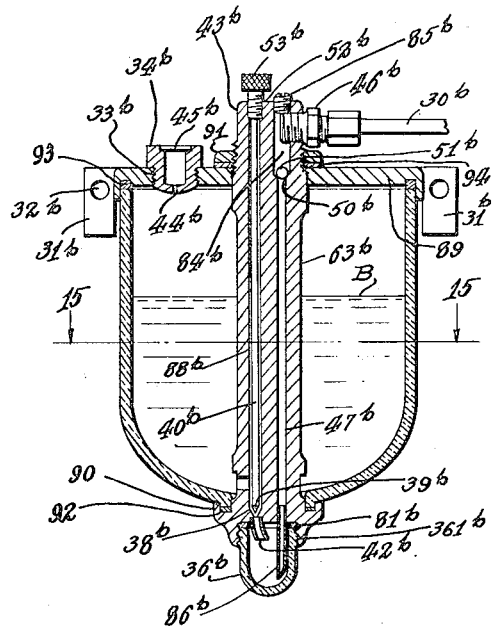
Fig. 15.
Fig. 14.
Inventor
George Leonard Neely
By Lyon & Lyon
Attorneys Patented Nov. 14, 1933

1,934,734

UNITED STATES PATENT OFFICE 1,934,734

LUBRICATOR FOR VALVES AND THE UPPER WALLS OF CYLINDERS

George Leonard Neely, Berkeley, Calif.

Application June 2, 1930. Serial No. 458,938

16 Claims. (Cl. 261—121)

This invention relates to lubricators for lubricating the valves and the upper walls of cylinders of internal combustion engines, and is an improvement on the disclosure of my co-pending application for patent, Serial Number 379,745, filed July 20, 1929.

It is generally agreed, among automotive engineers, that, in internal combustion engines, most of the wear of the cylinders and pistons and piston rings occurs at the time of starting the engine due to lack of lubrication and the washing effect of the unvaporized fuel. This is particularly significant in cold weather operation, since the crank case oil is sluggish and since carbureter choking is excessive. Furthermore, gum formation on valves, stems, guides, and piston rings is accentuated by rich mixtures, particularly occurring during starting. Both of these disadvantages can be avoided by admitting a relatively large quantity of oil to the intake manifold during the starting period, while the engine is cold.

By continuously feeding a small amount of lubricant to the intake manifold, while the motor is operating, the valves and piston rings are maintained free from gumming and there is less friction, thus resulting in increased power and speed. A continuous feed rate is particularly desirable in motors which consume comparatively little crank case oil, such motors being known as "dry" engines, and, also, in those motors in which sticking of the valves is due to dryness. The lubricant feed rate for motors in operation should be constant and should not decrease with the increase in motor speed. Due to the different lubricant requirements for different motors, the feed rate should be manually adjustable and visually ascertainable.

In common with the essential purpose of the construction disclosed in the above mentioned application, this present invention is designed to function as follows:

1. Deliver an excess of lubricant at the time of greatest need, to-wit: when the engine is cold and started into operation;

2. Deliver lubricant to the manifold suction stream at a fixed or constant rate regardless of degree of manifold vacuum and without the use of moving parts, after the engine has been started;

3. Provide means to visibly indicate the feed rate of lubricant to the intake manifold.

The first two functions are well taken care of by the construction disclosed in the above mentioned application and it is an important object of the present invention to accomplish the third function.

Another object is to provide a construction in which the oil reservoir will operate at a pressure less than atmospheric.

Another important object is to effect breaking up of the oil into a mist, and discharging the atomized oil in the center of the gas stream in the intake manifold, thereby obtaining good distribution of the oil to all the cylinders.

The lubricators to be described hereinafter more in detail, each embodies a small transparent cup, of glass or the like, which is positioned beneath an oil reservoir. This cup affords a means of visually determining the oil feed rate as the oil drips from the reservoir into the cup. The cup also serves as a basin in which accumulates a slug of oil for supplying to the engine, when the engine is being started cold, and said cup affords a positive means for visually ascertaining that the slug of oil is being supplied to the cylinders. Consequently, this cup is one of the important elements of the invention.

The invention may be variously embodied, the different embodiments all operating to produce a constant oil feed rate regardless of the degree of manifold vacuum, and without the use of pressure regulating devices involving the use of moving parts.

In one of the embodiments of the invention the feed rate is not affected by the manifold vacuum because the pressure in the drip cup is maintained atmospheric, and equal to the pressure above the oil in the reservoir, by utilizing a vertical air duct, for admitting air to the drip cup, of a sufficiently large cross-sectional area. A disadvantage of employing an air duct of large cross-sectional area is that it fills up with oil to the level of the oil in the reservoir when the device is not functioning, and hence, due to the volumetric capacity of said duct, the slug of oil to be supplied to the engine from the cup at the time of starting will vary considerably in volume which is dependent upon the level of the oil in the reservoir. However, the variation in size of the slug is kept at a minimum by reason of the reservoir being made of as shallow a depth, as is practicable, relative to its area.

In other embodiments of the invention, the air intake mentioned above is of somewhat smaller cross-sectional area and, accordingly, at higher manifold vacuum said duct functions as a constriction and, accordingly, there would result a slight pressure reduction in the drip cup and a consequential variable feed rate, were it not for the fact that atmospheric air is admitted to the reservoir in a manner to prevent the pressure drop in the air duct and to make the air pressures above the oil in the reservoir and drip cup alike.

The accompanying drawings illustrate several embodiments of the invention:

Fig. 3 is a vertical section on the line indicated by 3—3, Fig. 2.

Fig. 4 is a vertical section on the irregular line indicated by 4—4, Fig. 2.

Fig. 5 is an enlarged longitudinal view of the atomizing nozzle or quill mounted in the intake manifold shown in Fig. 1, a fragment of said manifold being shown in section.

Fig. 6 is an end view of the nozzle shown in Fig. 5, from the left thereof.

Fig. 7 is a view of the nozzle, mainly in vertical section on the line indicated by 7—7, Fig. 6.

Fig. 8 is a horizontal section on the line indicated by 8—8, Fig. 6.

Fig. 9 is a plan view, similar to Fig. 2, showing a reservoir and a modification of some of the parts associated therewith.

Fig. 10 is an elevation of Fig. 9, partly in section, from the line indicated by 10—10.

Fig. 11 is a vertical section on the line indicated by 11—11, Fig. 9.

Fig. 12 is a plan view of a modification of the reservoir and associated parts.

Fig. 13 is a horizontal section on the line indicated by 13—13, Fig. 12.

Fig. 14 is a vertical section on the line indicated by 14—14, Fig. 12.

Fig. 15 is a horizontal section on the line indicated by 15—15, Fig. 14.

Figure 1:
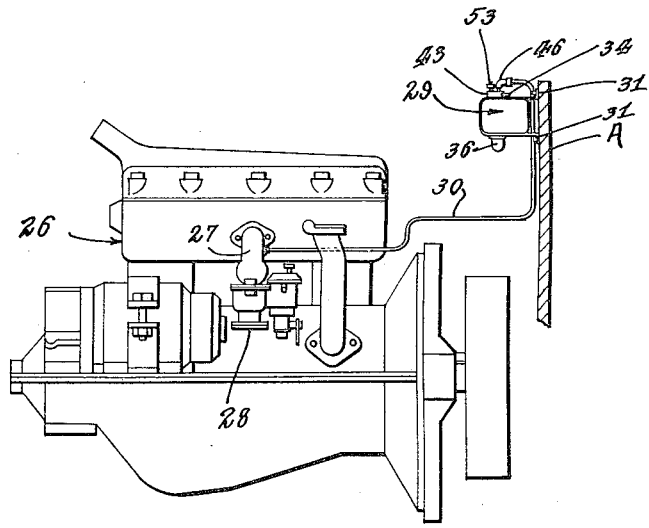
Figure 1 is a side elevation of a lubricator constructed in accordance with the provisions of this invention, an engine with which the lubricator functions also being shown.
Figure 2:
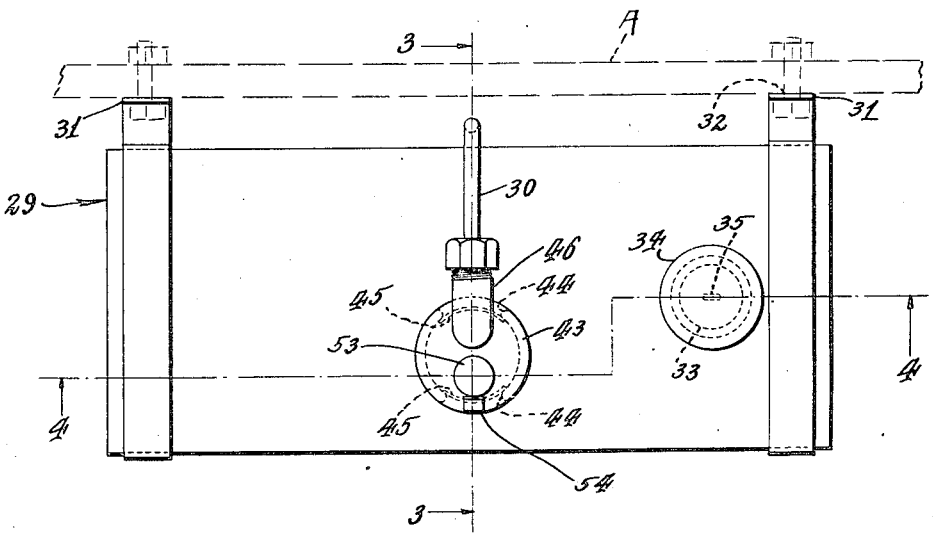
Fig. 2 is an enlarged plan view of the reservoir and some of the parts associated therewith.

Describing, first, the form of the invention illustrated in Figures 1 to 4 of the drawings, an internal combustion engine is indicated in general by the character 26 and the intake manifold at 27. The manifold 27 is supplied with carburetted air or combustible mixture by a carbureter 28 which is connected with said manifold. The engine 26, as is well understood in this art, is provided with the usual cylinders, pistons, valves and valve stem guides, not shown, all of which require lubrication and which are efficiently lubricated by this invention.

Located at any suitable point is a lubricant container or reservoir 29 which may be supported in any suitable manner as, for example, upon the front face of the instrument board or dash A. The reservoir 29 is connected by a conduit 30 with the manifold 27 at a point between the carbureter and the engine cylinders.

The reservoir 29 may be made of metal or other suitable material and, in this instance, it is practically rectangular and has a capacity of approximately one and a half pints. Projecting from the reservoir 29 are brackets 31 by which said reservoir is secured to the instrument board or other support A, said brackets being provided with screw holes 32 for this purpose.

The container is supplied with a liquid through an opening 33 which is ordinarily closed by a plug 34 screwed into said opening. In this instance, the plug 34 has attached to it a gauge strip 35 for ascertaining the level of lubricant in the container.

Beneath the container 29 is a transparent chamber or drip cup 36, constructed of glass or other suitable material.

The cup 36 is secured by a holder 37 to the bottom of the container so that the connection is oil-tight. In this instance, the drip cup 36 is threaded at 361 into the holder 37. The holder 37 is provided with a seat 38 for a needle valve 39, the stem 40 of which projects upwardly through an opening 41 in the top of the container. The valve 39 controls a port 42 that opens communication between the cup 36 and the container 29. Secured to the top of the container 29 is a hollow support 43 provided in the side thereof with an opening or openings 44 which, preferably, are covered by screen 45. Rigidly attached to the support 43 is an elbow fitting 46 which, in this instance, is screwed into the top of the support 43 so that the bore of the fitting 46 communicates with the interior of the support 43. To the fitting 46 is connected the tubing 30.

Fixed in the bore of the fitting 46 is the upper end of a suction tube 47 which extends downwardly to near the bottom of the cup 36, said tube communicating the bore of the fitting with the cup 36.

Surrounding the suction tube 47 is a stand pipe or air tube 48 which is suitably sealed to the bottom of the reservoir, the sealing being effected, in this instance, by screwing the stand pipe into the holder 37, thus communicating the bore of the stand pipe with the cup 36. The upper end of the stand pipe 48 projects through an opening 49 in the top of the reservoir 29 and, thus, the bore of the stand pipe communicates with the interior of the support 43.

The upper end portion of the suction tube 47 has a restricted orifice 50 and a check valve ball 51 is provided immediately above the orifice 50 so as to close over said orifice. This valve 51 is provided so as to function to close the suction tube 47, in event of back-firing of the engine.

The needle valve stem 40 is adjustably connected with the support 43, being threaded, in this instance, at 52 into said support. The needle valve may be turned by a knurled head 53 for adjustment of the valve relative to its seat and engaged with the knurled head is a spring 54 to yieldingly hold said head against turning.

The construction of the invention hereinbefore described will now be understood and the operation is as follows:

The container will be filled with oil, indicated at B. The engine is started into operation in a well known manner and the lowered pressure in the intake manifold causes air to be drawn through the screen 45, down through the annular space between the suction tube 47 and stand pipe 48 and upwardly through the tube 47, fitting 46, tubing 30 to the engine cylinders.

The needle valve will be adjusted to give the desired feed rate which can be visually noted in the cup 36. As the oil accumulates in the cup 36, it closes the lower end of the suction tube 47 and is carried by the air stream to the engine. It will be seen that variation in the degree of manifold vacuum has no appreciable effect on the feed rate of the oil since, whenever there is a sufficient degree of vacuum to suck gasoline into the carbureter, there is also a sufficient degree of vacuum to suck oil from the cup 36. A relatively high degree of manifold vacuum does not increase the feed rate of the oil as the annular space between the tube 47 and stand pipe 48 is of sufficient cross-sectional area to maintain the pressure within the cup 36 substantially atmospheric.

However, should a pressure less than atmospheric exist in the cup 36, an equal pressure would exist above the oil in the container because of the openings or slots 55, which are provided in the upper end of the stand pipe 48, said openings 55 communicating the upper bore portion of the stand pipe with the container.

After the motor has been operating and is stopped, a certain amount of oil will continue to drip into the cup 36 and thence rises in the stand pipe 48 until the oil in said stand pipe reaches the same level as the oil in the container. Since the volumetric capacity of the stand pipe 48 is comparatively small, and the container is comparatively shallow, there will not be much variation in the volume of oil in the suction tube when the container is full of oil and when it is nearly empty. Thus, the slug of oil to be supplied to the engine, in starting, will not vary to any great extent in volume with the variation in level of the oil in the container.

When the motor is again started into operation, all of the oil in the stand pipe 48 and cup 36 will be quickly drawn into the intake manifold and thence to the engine cylinders, thus almost immediately emptying the cup 36 and, therefore, the feed rate of the oil to the engine, predetermined by adjustment of the needle valve 39, will prevail until the motor is again stopped.

It will be readily understood that, if the motor is started after being stationary for only a short time, there will be a less volume of oil in the cup 36 and standpipe 48 than if the motor has been stationary for a longer period of time. This is quite an advantage as, when the motor has been stationary but a short time, it is still warm and all of the oil has not drained from the cylinders and, accordingly, a smaller charge of oil is required in starting. Thus, the device automatically proportions the amount of oil supplied to the engine at starting depending upon the requirements.

Variation in the rate of feeding the oil, due to variation in the oil level in the container, is minimized by reason of the container being of relatively shallow depth.

In Figure 5 is shown a fragment of the intake manifold 27 and a special quill or nozzle 56 to which the tube 30 preferably connects. The quill is further illustrated in Figs. 6, 7 and 8.

The quill 56 comprises a T-fitting 57 and a tube 58 fixed at one end in the bore of the fitting 57. The fitting 57 is externally threaded at said end 59 into the intake manifold 27. This fitting 57 permits of the connection of a tube to the vacuum tank of the automobile or the tube to the vacuum-operated type of windshield wiper.

In this instance the tube 58 is open at its outer end and has a relatively wide opening 60 in its underside and a relatively narrow slot 61 in its sides and top, said slots 60, 61, in this instance, extending to the adjacent end of the tube.

It will be seen that the tube 58 projects to a point that lies within the central portion of the fluid stream passing through the intake manifold and that the oil will be sufficiently sprayed by the slots 60, 61 into the central portion of said air stream. The size of the slots 60, 61 will govern the size of the oil particles.

Figures 9 to 11, inclusive, illustrate a modified form of the invention, the elements thereof that are the functional equivalents of those hereinbefore described being indicated by the same reference characters with the addition of the suffix $a$.

In this instance, the container 29$a$ is provided at one side with a sight glass 62 whereby the level in the container may be readily observed. The sight glass 62 is mounted in one side of a metal support 63 which may be a casting, the sight glass 62 being interposed between upper and lower lugs 64, 65. The lower lug 65 is provided with a recess 66 into which the lower end of the glass projects and the lower end of the sight glass is sealed in the recess 66 as indicated at 67.

The upper end of the sight glass 62 extends into a hole 68 in the lug 64, there being threaded into said hole a plug 69 to force the sight glass towards the lug 65. The upper end of the sight glass is sealed at 70 to the plug 69 which is provided with a duct 71 that communicates at one end with the bore of the sight glass and at its other end with a horizontal duct 72 provided in the member 63. The duct 72 communicates with a filling opening 73 over which closes a hinge cover 74 that is provided with an air hole 44$a$. Seated on an annular shoulder 76 within the opening 73 is a screen 45$a$. The filling opening 73 communicates with the interior of the container 29$a$ through an opening 73, the member 63 being suitably secured to said container 29$a$.

The lower end of the bore of the sight glass 62 communicates with a duct 79 that in turn communicates through an opening 80 with the lower portion of the container 29$a$.

When the reservoir is being filled with oil, said oil passes through the duct 79 and up into the sight glass. The air above the oil in the sight glass passes out through the ducts 71, 72 and through the screen 45$a$ and air hole 44$a$. The drip cup 36$a$ is threaded at 361$a$ into the holder 37$a$ which, in this instance, is formed by the lower end of the member 63, and the drip cup is properly sealed to the holder 37$a$ by a suitable gasket 81.

The upper end of the casting 63 constitutes the support 43$a$ into which the stem of the valve is threaded.

The tubing 30$a$ which connects the intake manifold with the member 63 has a compression coupling 82 that is threaded into the lug or boss 64, the bore of said compression coupling 82 communicating through a small duct 83 which communicates with a valve chamber 84 in the upper portion of the casting 63.

The check valve 51$a$ is positioned in the chamber 84 and a plug 85 closes the upper end of said valve chamber. A portion of the casting 63 constitutes a portion of the suction tube 47$a$ which is controlled by the valve 51$a$ and another portion of said suction tube is indicated at 86 and is constructed separate from the casting 63 and fixed in said casting and projects downwardly to near the bottom of the drip cup 36$a$.

A portion of the casting 63 constitutes a stand pipe 48$a$ which communicates at its upper end with a horizontally extending duct 87 within the casting 63, said duct 87 also communicating with a vertical duct 88 through which extends the valve stem 40$a$, the upper end of said duct 88 communicating with the duct 72 while the lower end of the duct 88 communicates with the duct 79. The lower end of the stand pipe 48$a$ communicates with the drip cup 36a. The duct 87 is closed at its outer end by a plug 871.

The form of the invention just described operates as follows:

The reservoir 29a is filled with oil and the engine is started into operation. The lowered pressure in the intake manifold causes air to be drawn through the air hole 44a, screen 45a, duct 72, duct 87, down through the stand pipe 48a, thence through the suction tube past the check valve 51a and through the duct 83 and tubing 30a to the intake manifold.

The needle valve is adjusted to give the desired feed rate of the oil, as observed in the drip cup 36a. The oil accumulates in the drip cup so as to cover the lower end of the tube 86, whereupon the oil is entrained by the air flowing through the drip cup so as to pass that air to the cylinders of the engine.

Whenever there is a sufficiently high degree of vacuum to draw gasoline from the carbureter, not shown, there is also a sufficient degree of vacuum to pull oil from the drip cup.

It will be observed that variation in the degree of manifold vacuum has no effect on the feed rate of the oil as the duct 83 and orifice 44a, being constrictions, cause a reduction in pressure in the container above the oil to correspond with any reduction in pressure that may exist in the drip cup, regardless of the comparatively small cross-sectional area of the stand pipe 48a. Accordingly, the oil feed rate is wholly dependent upon the head of oil above the valve seat 38a.

After the motor has operated and is then stopped, oil will continue to drip into the drip cup from the port 42a until the cup is full and the suction tube 47a and stand pipe 48a have been filled to the level of the oil in the reservoir. When the motor is again started into operation, all of the oil in the suction tube, stand pipe and drip cup will be quickly drawn into the engine cylinders and, thereafter, the feed rate will be maintained in accordance with the adjustment of the needle valve.

Another modification of the invention is illustrated in Figures 12 to 14, inclusive, and the elements that correspond in function to those described above in connection with the form of the invention illustrated in Figures 9 to 11, are indicated by the same numeral portions of the reference characters with the addition of the suffix b.

In this instance, the reservoir or container 29b is transparent, being of glass or other suitable material. The brackets 31b are integral with the metal cover 89 of the reservoir. The filling hole is shown at 33b and the plug 34b is provided with an orifice 44b and with a screen 45b.

In this instance, the member 63b, which may be a casting, extends centrally through the reservoir 29b. The reservoir is clamped between an annular shoulder 90, on the member 63b, and the cover 89 by a nut 91 which is threaded onto the upper portion of the member 63b. There is a gasket 92 between the shoulder 90 and the lower end of the reservoir, another gasket 93 between the reservoir and its cover, and a third gasket 94 between the nut 91 and the cover 89 so as to seal these plates liquid-tight.

This last described form of the invention operates the same as the form described for Figures 9 to 11, inclusive, and, accordingly, the description need not be repeated.

Although certain specific forms of the invention have been described in considerable detail hereinabove, it will be understood that the invention is not limited to the specific embodiments illustrated or described. Numerous changes and modifications will be obvious to those skilled in the art from the description given hereinabove and all such changes and modifications as come within the scope of the appended claims are embraced thereby.

I claim:

1. A lubricator comprising a container, a drip cup below the container, port-forming means between the container and drip cup, a valve to control said port, a suction tube projecting into the drip cup, and an air tube sealed at its lower end to the drip cup and projecting above the level of the container and opening above said level to the atmosphere.

2. A lubricator comprising a container, a drip cup connected with the bottom of the container, port-forming means between the container and drip cup, a valve to control said port, an air tube sealed at its lower end to the drip cup and projecting above the level of the container and open above said level to the atmosphere, and a suction tube projecting into the drip cup and extending upwardly through the top of the container.

3. A lubricator comprising a container, a drip cup connected with the bottom of the container, port-forming means between the container and drip cup, a valve to control said port, a suction tube projecting into the drip cup, and an air tube sealed at its lower end to the drip cup and projecting upwardly through the top of the container and open to the atmosphere above said container.

4. A lubricator comprising a container, a drip cup below the container, port-forming means between the container and drip cup, a valve to control said port, an air tube sealed at its lower end to the drip cup and projecting above the level of the container and open above said level to the atmosphere, and a suction tube inside of the air tube projecting into the drip cup.

5. A lubricator comprising a container, a drip cup connected with the bottom of the container, port-forming means between the container and drip cup, a valve to control said port, an air tube sealed at its lower end to the drip cup and projecting upwardly through the top of the container and open to the atmosphere above said container, and a suction tube inside of the air tube projecting into the drip cup.

6. A lubricator comprising a container, a drip cup below the container, port-forming means between the container and drip cup, a valve to control said port, a suction tube projecting into the drip cup and provided with a restricted orifice, a check valve to prevent back pressure through said orifice, and an air tube sealed at its lower end to the drip cup and projecting above the level of the container and open above said level to the atmosphere.

7. A lubricator comprising a container, a drip cup below the container, port-forming means between the container and drip cup, a valve to control said port, a suction tube projecting into the drip cup, and an air tube sealed at its lower end to the drip cup and projecting above the level of the container and open above said level to the atmosphere, the effective cross-sectional area of the air tube being sufficiently great so that the pressure within the drip cup will be substantially atmospheric irrespective of the degree of partial vacuum created in the suction tube.

8. A lubricator comprising a container, a drip cup below the container, port-forming means between the container and drip cup, a valve to control said port, a suction tube projecting into the drip cup, and an air tube sealed at its lower end to the drip cup and projecting above the level of the container and open above said level to the atmosphere, said air tube provided with an opening communicating the upper portion of the container with the upper portion of the air tube.

9. A lubricator comprising a container, a drip cup below the container, port-forming means between the container and drip cup, a valve to control said port, a support mounted on the top of the container, a stem for the valve adjustably connected with the support, a suction tube projecting into the drip cup, and an air tube sealed at its lower end to the drip cup and projecting above the level of the container and open above said level to the atmosphere.

10. A lubricator comprising a container, a drip cup below the container, port-forming means between the container and drip cup, a hollow support mounted on the top of the container and provided with a screened opening, a valve to control said port, a stem for the valve adjustably connected with the support, a suction tube projecting into the drip cup, and an air tube sealed at its lower end to the drip cup and having its upper end projecting into said support.

11. A lubricator comprising a container, a holder secured to the bottom of the container and provided with a port, a drip cup secured to said holder, a valve to control said port, a suction tube projecting through the holder into the drip cup, and an air tube connected at its lower end to the holder and projecting above the level of the container and open above said level to the atmosphere.

12. A lubricator comprising a container, a drip cup below the container, port-forming means between the container and drip cup, a valve to control said port, a suction tube projecting into the drip cup, a check valve in said suction tube, an air tube sealed at its lower end to the drip cup and projecting above the level of the container and open above said level to the atmosphere.

13. A lubricator comprising a container, a casting secured to one side of the container and forming an air tube and forming a valve chamber and forming a portion of a suction tube, a tube forming another portion of the suction tube, a drip cup secured to the lower end of the casting and surrounding the second mentioned tube, the lower end of the air tube communicating with the drip cup, the valve chamber communicating through a port with the drip cup, a valve in the valve chamber to control said port, a stem for said valve adjustably connected with said casting, a means to connect a tube with said casting, said casting provided with an orifice communicating the suction tube with said means, the casting provided with a duct communicating with the atmosphere and with the upper end of the valve chamber, the casting provided with another duct that communicates with the container and with the valve chamber, and the casting provided with another duct communicating with the lower portion of the container and with said valve chamber.

14. A lubricator comprising a container, provided with an opening in its bottom, a cover for the container provided with an opening, a casting extending through the container and projecting through said openings, said casting forming an air tube and forming a valve chamber and forming a portion of a suction tube, a tube forming another portion of the suction tube, a drip cup connected with the lower end of the casting and surrounding the last mentioned tube, said casting provided with a port between the valve chamber and the drip cup, a valve in the valve chamber to control said port, a stem for the valve adjustably connected with the casting, the lower end of the air tube communicating with the drip cup, the casting provided with a duct communicating the upper end of the air duct with the upper portion of the container, and a means to connect a tube to the casting and to communicate said tube with the suction tube.

15. In combination, a container for oil, a drip cup below the container, conduit means between said container and drip cup, means for feeding oil into said drip cup from said container and to form a body of oil in said drip cup unless said oil is withdrawn, and a suction tube extending from the lower portion of the drip cup to the intake manifold of an internal combustion engine, the highest point of said suction tube being above the oil level in the container.

16. In a lubricator, the combination of a container for oil, a drip cup below the container, conduit means between said container and drip cup, said conduit means comprising flow control means, a suction tube projecting into the lower end of said drip cup, and conduit means connecting the upper end of said drip cup with the atmosphere at a point above the oil level in said container.

GEORGE LEONARD NEELY.